Sept. 5, 1961 R. F. PATTERSON 2,998,949
AERODYNAMIC DRAG DEVICE
Original Filed Dec. 15, 1956 3 Sheets-Sheet 1
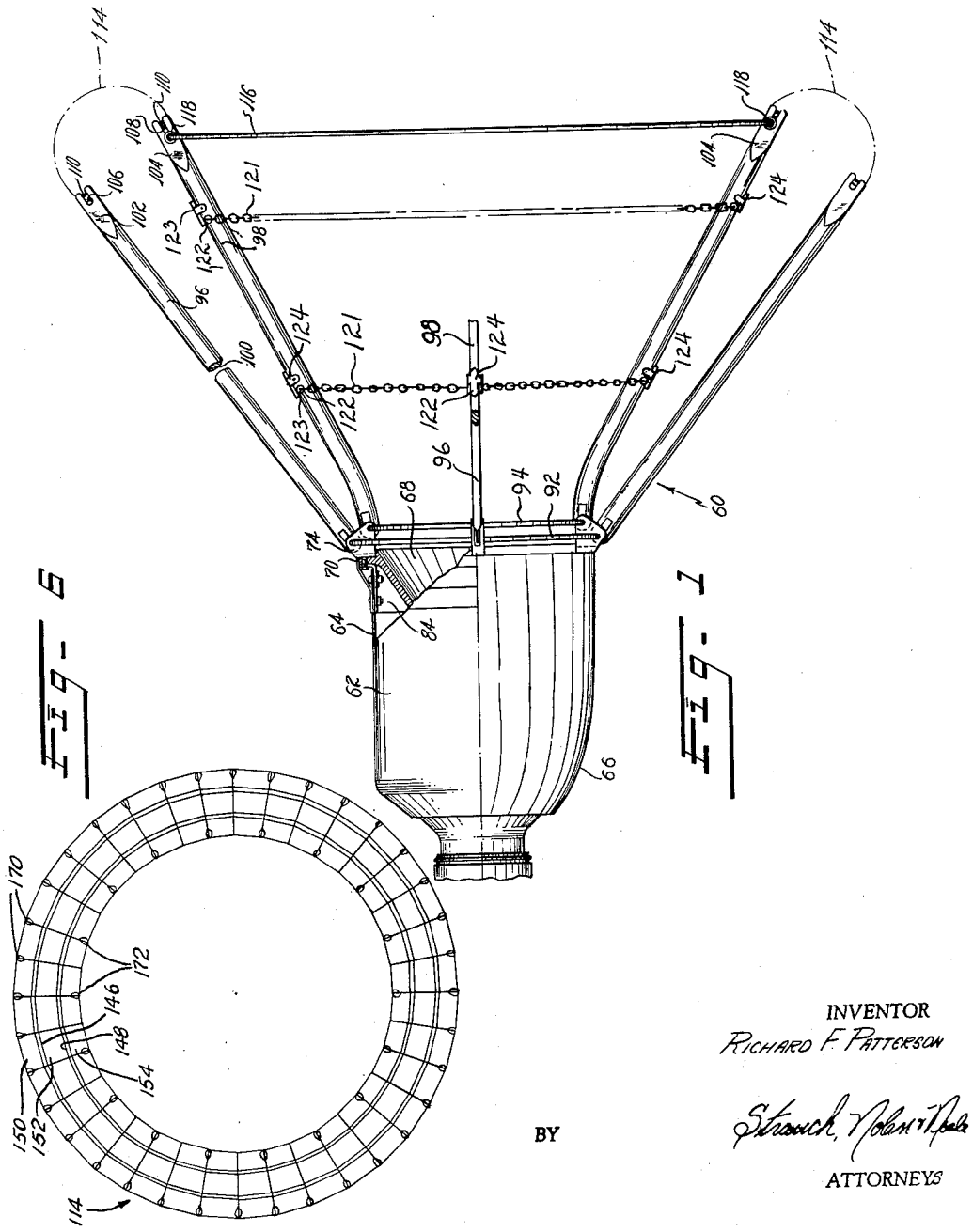
INVENTOR
RICHARD F. PATTERSON
BY Strauch, Nolan & Neale
ATTORNEYS

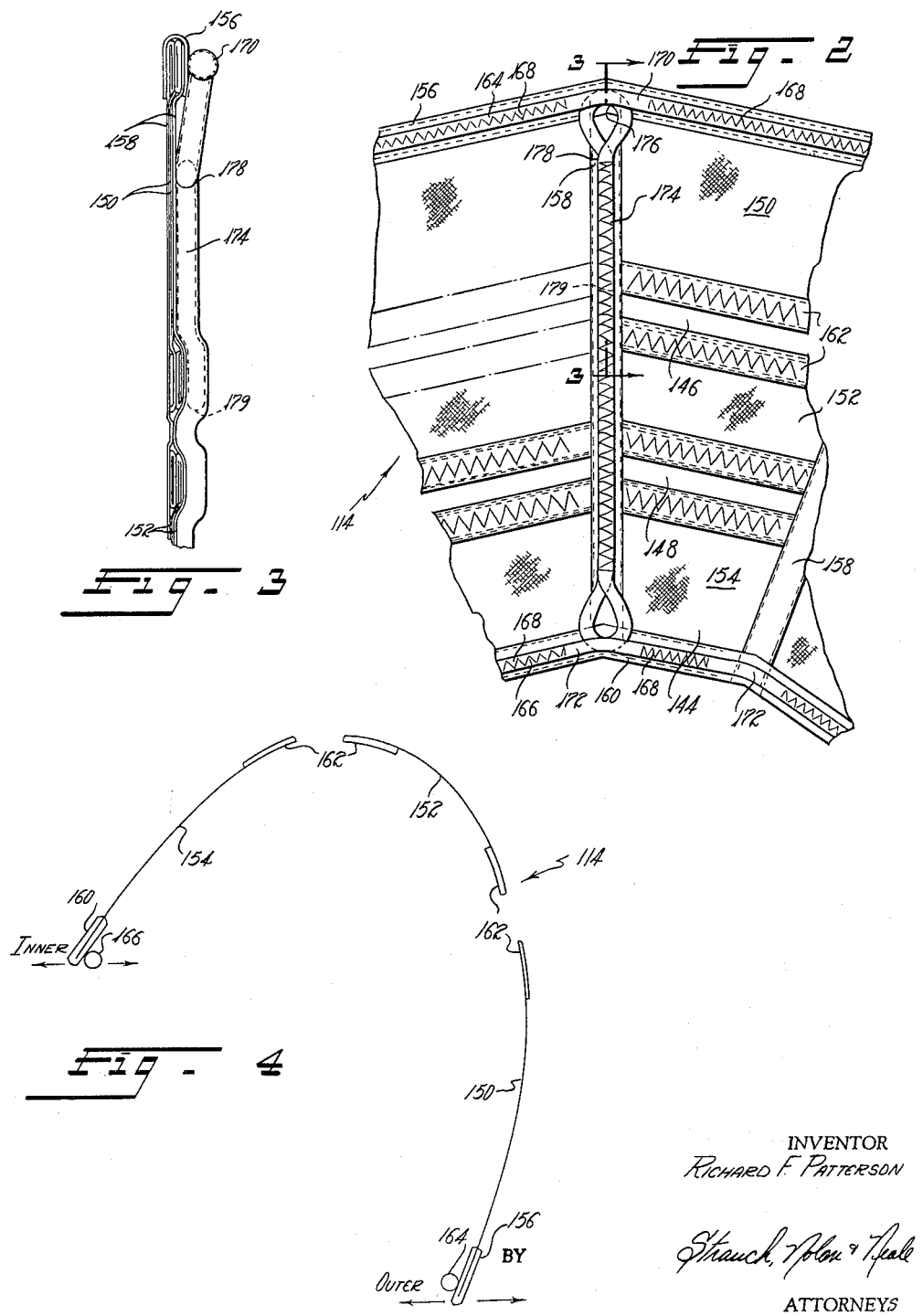

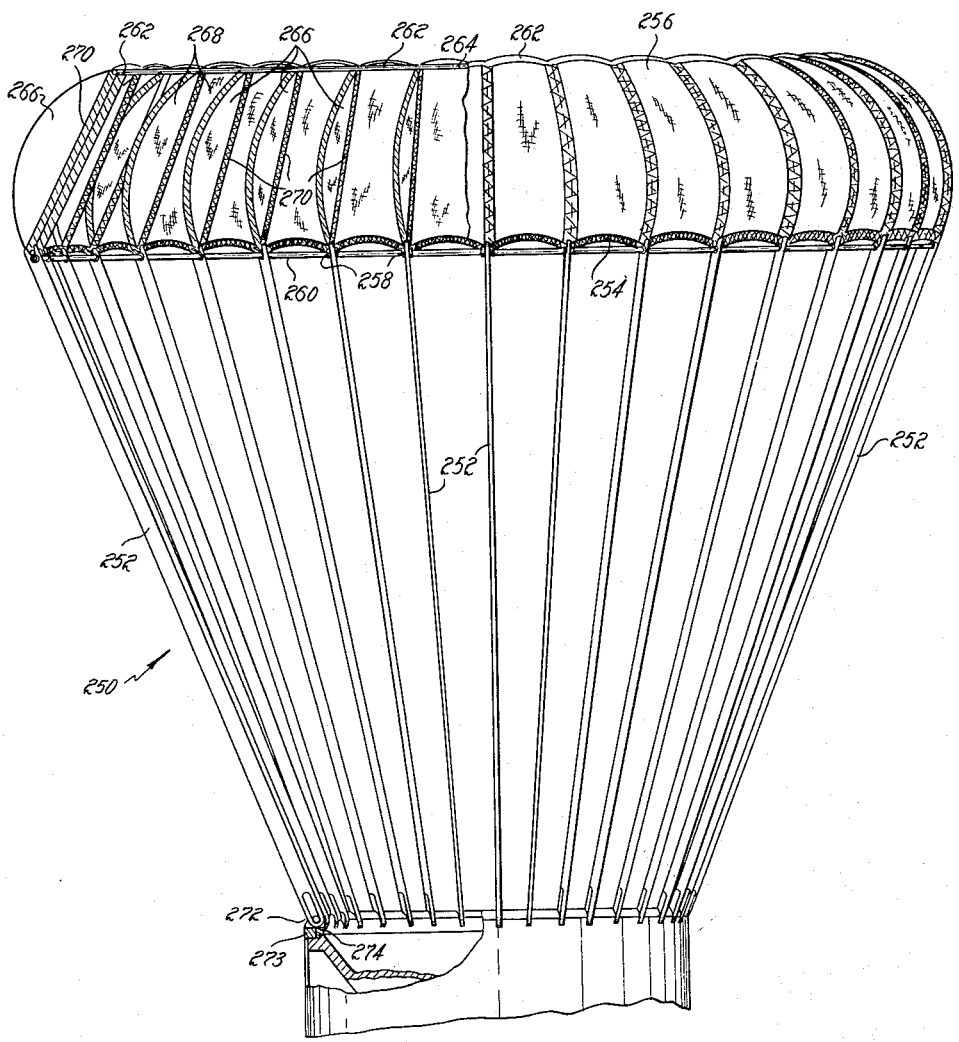

United States Patent Office 2,998,949
Patented Sept. 5, 1961

2,998,949
AERODYNAMIC DRAG DEVICE
Richard F. Patterson, 6912 Wish Ave., Van Nuys, Calif.
Original application Dec. 15, 1956, Ser. No. 553,276, now Patent No. 2,823,881, dated Feb. 18, 1958. Divided and this application Jan. 7, 1957, Ser. No. 632,880
7 Claims. (Cl. 244—145)

This invention relates to an aerodynamic drag construction having particular reference to canopy structure and is a division of United States application Serial No. 553,276, filed December 15, 1956, now Patent No. 2,823,-881.

In particular this invention consists of a ring shaped drag inducing body exemplified specifically as a parachute type drogue, and disclosed in the aforementioned application Serial No. 553,276 as part of in-flight refueling apparatus for aircraft to illustrate a preferred embodiment of the invention. It is to be understood that the canopy disclosed and claimed herein has applications in environments other than with an inflight refueling drogue.

Two major types of refueling apparatus are presently being used, the "flying boom" and the "probe and drogue." The flying boom apparatus has been highly developed and is in widespread use, particularly by the United States Air Force. Flying booms are substantially rigid tubes, sometimes extensible, and generally have control surfaces adjacent the coupling end by which an operator in the mother aircraft can guide the boom relative to the following aircraft until the connection is made. The high normal speeds of present day jet aircraft cannot be maintained by a boom-type mother aircraft because of the abnormal drag characteristics resulting from the boom and related control structure, that effect the control of the mother aircraft and also create a dangerous wake condition ahead of the following aircraft. In refueling by the boom method, jet aircraft must reduce their airspeed almost to the critical stall speed, placing added strain on the pilot of the following aircraft and making stable control during connection and refueling more difficult.

The drogue and probe hose system has an inherent flexibility and simplicity that substantially overcomes the disadvantages of the rigid flying boom system, enabling the mother aircraft and following aircraft to have a greater freedom of movement relative to each other. A hose trailing from an aircraft will at times have a tendency to whip, therefore a stabilizing device is necessary. The trailing coupling must resist forward movement of the probe, hence a drag device must be incorporated at the hose end. To facilitate reception and coupling of the following aircraft, a target with means to guide the probe of the following aircraft into the coupling must be provided at the hose end. Such devices providing stability, drag, target and probe guide have invariably been solid configurations such as funnel or cone shaped members fastened to a coupling on the end of a hose.

A cone shaped drogue serves its purpose at low speeds but, due to aerodynamic factors, becomes highly unstable and is considered unsatisfactory at anything above moderate speeds. It is believed that the following factors create such instability. The relatively massive coupling creates a drag that has a center of pressure substantially midway of the coupling length. A cone drogue placed on the coupling creates additional drag with a center of pressure approximately one-third of the distance from the leading edge of the cone to its trailing edge. The resultant center of pressure (referred to hereinafter as C.P.) of coupling and cone occurs approximately at the joinder between coupling and cone, well forward in the overall drogue configuration. Such a location provides an increasing unstable condition as airspeed increases and yawing tendencies in and yaw conditions effecting the drogue are magnified, resulting in an erratic, weaving and bobbing target that is practically impossible for a following plane to contact.

A further factor that renders the cone drogue unsuitable at higher speeds is its wake pattern. As the "free" air stream approaches the cone and starts to diverge, the air becomes accelerated. Thus the air stream flows from the trailing edge of the cone at a relatively high velocity. Within and immediately behind the cone is a low pressure area with negligible and possibly reverse flow air velocity. The high velocity air stream cylinder passing aft of the cone coacts with the inner void and, due to the Bernoulli effect, creates an extremely turbulent wake behind the cone.

These aerodynamic aspects of a cone drogue have two primary effects during attempts by a following aircraft to insert and couple a probe into the cone and coupling at the end of a trailing hose. The first effect may be termed "excitation" of the drogue, resulting primarily from instability of the drogue, due to the approaching probe. As the following aircraft with projecting probe approaches the drogue, a pressure front (mass of high-pressure air) existing just ahead of the aircraft passes into the turbulent drogue wake creating a relatively high pressure behind the drogue and increasing the turbulence of the air mass in the vicinity of the drogue. The cone drogue will float and dance just ahead of the probe, creating an impossible target. A second effect is "buffeting" and is that effect experienced by the following aircraft moving into the turbulent wake of the drogue.

An additional unsatisfactory aspect of a solid configuration drogue is its constant high drag coefficient that results in an increasingly flattened hose trail angle as higher speeds are experienced. As the hose trail angle flattens, the drogue follows more directly in the wake of the "mother" aircraft, hence the following aircraft must also fly in that wake to make a connection, a very undesirable position.

By this invention a drogue with novel canopy structure is proposed that is capable of satisfactory operation over a wide speed range including high speeds, that is satisfactorily stable, that is less susceptible to "excitation," and that will create a smoother wake to effectively decrease any tendency to "buffet" the following aircraft. The following factors are considered very important. The drogue must necessarily create sufficient drag on the coupling to maintain a trailing portion of the hose in substantially horizontal trail yet the overall hose trail angle should not approach a flattened angle. The drogue should be capable of decreasing its own drag area with increased airspeed to avoid placing too high a drag on the refueling hose and associated structure in the mother aircraft. Another desirable feature is ease in manipulation of the drogue during extension and retraction from the mother aircraft.

The following factors are realized by the basic configuration of the novel drag device.

Stability is accomplished by positioning the drag producing body well aft of the reception coupling and supported from the coupling body by narrow, spaced arms that have little drag effect on the whole structure. The drawings illustrate the drag device in its preferred embodiment as a collapsible ring shaped parachute having skirt and vent perimeters fastened to a plurality of slightly flexible elongate support arms extending from the reception coupling. For purposes of this disclosure the drag C.P. of the parachute canopy can be assumed as a point centrally located in the canopy ring and midway of the depth of the canopy. The canopy drag C.P. location is thus approximately at the trailing edge of the drogue structure. By streamlining the coupling housing, its drag C.P. location shifts aft and the drag will be decreased, hence the major drag of the combined drogue and coupling will be furnished by the parachute canopy, and resultant combined drogue and coupling C.P. location exists substantially within the annular zone defined by the parachute. With drag force and its C.P. location well aft, an extremely stable drogue is obtained.

Use of a ring shaped canopy carried by a plurality of divergent support arms provides an excellent target at which the following aircraft may aim. The divergent support arms guide the probe to connecting engagement with the reception coupling and also permit airflow at substantially "free" air velocity through the large center opening of the canopy. The central free air stream and the outer free air stream relative to the ring shaped canopy receives a relatively low acceleration from the drogue of this invention as compared with the acceleration imparted to the air stream flowing past solid drogues such as a cone, so the area behind the canopy ring area is much less turbulent than that existing behind a cone drogue. Because of the relatively continuous area of "free" air stream behind this ring shaped rearwardly offset drogue, the "excitation" effect will be substantially decreased and may be eliminated and "buffeting" of the following aircraft will be negligible or eliminated because of the relatively smooth wake occasioned by airflow through the center of the ring. Available flight test results indicate that excitation and buffeting are essentially absent.

By pivotally mounting the parachute canopy support arms on their supporting coupling, the parachute canopy may assume its most advantageous dynamic drag shape at varying airspeeds, and may also be collapsed during retraction. A further advantage is realized in that canopies of different areas can be used on the same support arms to create different drag characteristics for refueling operations at different airspeeds. The canopy can be made of any light weight material capable of withstanding a high drag force. For example, it can be made from woven materials such as nylon, porous cloth material as used in duplon type parachutes or metallic mesh of various porosities, or of metal or other known light weight materials, although it is preferable that the material and canopy be collapsible so the beneficial effects of pivoted riser arms can be realized.

The basic invention includes a new general purpose parachute canopy that for present purposes may be aptly termed a ring-foil-slot type canopy which has three concentric ring panels and the preferred number of slots in the reception coupling drogue canopy is two.

Two types of general purpose parachutes are presently known which should not be confused with this new canopy, namely, the air foil parachute and the ring slot parachute. To avoid confusion with these two presently known parachutes, it is herewith pointed out that the ring slot parachute uses a flexible cord line system requiring enveloping of the entire canopy and suspension system in a deployment bag in order to function. The size of the vent in the ring slot canopy has always been limited to the order of 0.5% of total canopy area for efficient and proper operation, whereas the new canopy of this invention operates very satisfactorily with vent areas in the order of 47% of the projected area. The functional operation of the ring slot canopy is materially different, in that the stress concentration in the canopy increases from the skirt upward with the greatest concentration of stress taking place in the upper one-quarter or one-third of the canopy area, whereas the ring-foil-slot canopy of this invention has the greater percentage of total lift generated by the intermediate panel or panels while the outer and inner panels provide variable pressure fields across the canopy ring section to establish its shape under aerodynamic load.

The second prior art parachute has an air foil type canopy, which is designated as a portion of a sphere cut by two parallel planes and, as projected, takes the form of a circular plate with the smaller diameter at the vent, resulting in an air foil section of infinite span. Vent areas range in the order of 40–50%. The suspension system is similar to the ring slot type except that the smaller diameter suspension lines are tied to the outer diameter lines at various lengths below the canopy skirt. Although both the air foil canopy and the ring-foil-slot canopy of this invention are true ring canopies, the drag of the air foil canopy depends on the maintenance of a continual air foil section under dynamic load and the arrangement of the suspension lines for its shape and critical velocity range, whereas the ring-foil-slot canopy of this invention depends upon the intermediate ring panel, or, if more than one, the intermediate panels for major drag with outer and inner ring panels providing the shape under aerodynamic load by generating opposing radial tension vectors, maintaining the central ring panel(s) substantially normal to the air stream.

The ring-foil-slot canopy has a drag configuration controlled by the aerodynamic characteristics of inner and outer annular or ring panels, both having a continuous span airfoil configuration, controlling a middle ring drag panel(s) disposed substantially normal to the airstream. In this specification and claims, "continuous span" airfoil or airfoil panels means a circular, annular or ring shaped panel having in radial cross-section an airfoil section shape. Since in a ring shaped panel there is no end to the airfoil span, the span is endless or, in other words, it is continuous. This canopy has been devised to provide good stability with a relatively low drag coefficient at high airspeeds. As its dynamic shape changes with increased airspeeds, actually presenting less flat plate area, the drag area will decrease and a curve of total drag v. Mach No. will approach a curve between an exponential and linear curve rather than a pure exponential curve resulting from a constant drag area.

The same versatile drag results may be obtained in a novel manner by providing one annular set of pivoted arms attached to the outer perimeter of a modified ring shaped canopy. Such pivoted arms provide sole support for the canopy and also constitute a guide fence for a probe. The inner hem of the canopy includes a cable of fixed circumference which fixes the operative circumference of the inner perimeter, and fixed arcuate canopy spacers determine the maximum distance between inner and outer perimeters. This configuration, when employed under dynamic load conditions results in the canopy assuming its proper shape and might be thought of as a controlled "wind sock" type of aerodynamic drag device. Upon retraction, the pivoted arms fold back and collapse the canopy, the flexibility of the inner perimeter cable permitting the canopy to fold behind the arms.

The connections between the arms and the canopy provide a more rigid pivot support and also enable ease in removal and replacement of the canopy.

Accordingly, a primary object of this invention is to provide a novel drag device having a stable drag configuration with decreased turbulent wake.

Another object resides in the provision of an improved parachute drag device having such aerodynamic properties as to maintain a stable open position under widely varying conditions of air stream velocity.

Still another object resides in the provision of a novel ring-foil-slot canopy arranged to be readily fastened to support arms on a drag device and having such aerodynamic properties as to maintain a stable open position under widely varying conditions of air stream velocity.

Further objects and advantages of the invention will be apparent from the following description and the appended claims taken in conjunction with the accompanying drawings. The preferred embodiments of the invention herein disclosed are illustrated in the following drawings in which:

FIGURE 1 is a side view, partially broken away and sectioned, illustrating a modified drogue with a majority of the support arms removed for clarity and having a lashing cable cooperating with the inner or rear support arms;

FIGURE 2 is a lay-out view of a portion of a preferred ring-foil-slot canopy illustrating the manner of reinforcing, stitching and attachment of loops;

FIGURE 3 is a section view taken on line 3—3 of FIGURE 2 and illustrates the reinforced folds of the canopy panels;

FIGURE 4 is a diagrammatic radial cross-section through the canopy showing the aerodynamic shape assumed in operation;

FIGURE 5 is a side view partially broken away illustrating a further embodiment of the collapsible drag device of this invention using one annular set of pivoted arms with a slightly modified canopy; and FIGURE 6 is a diagrammatic showing of a complete canopy.

An operative embodiment of the drag device of this invention is illustrated in FIGURE 1. The drogue 60, for purposes of illustration but not limitation, is attached to an in-flight refueling reception coupling 62 substantially identical to that disclosed in FIGURE 8 of U.S. Patent No. 2,692,102. It is to be understood that the drag device can be fastened to any reception coupling or other body requiring an aerodynamic drag device and if necessary appropriate adaptors may be used.

It is preferable, but not necessary, to contour the outer casing 64 of the reception coupling 62, as shown by the lower half 66 of the coupling in FIGURE 1, to present a streamlined body to the airstream, decreasing drag and shifting the drag center of pressure of the reception coupling 62 aft for better stability. The rear end of the reception coupling 62 is provided with a funnel shaped reception opening 68 that can receive and guide a probe (not shown) into seating and coupled engagement inside the coupling in a conventional manner. The perimeter of the funnel-shaped opening 68 of the conventional coupling 62 is provided with an annular radial flange 70, normally used in conventional drogues as a mounting flange for a solid frusto-conical or funnel-shaped drag structure.

A plurality of lug fittings 74 are arranged around the support coupling flange 70 with their studs projecting through holes toward the front of coupling 62. The radial relationship of the circumferentially arranged lug fittings 74 is maintained by two lock rings 92 and 94 that respectively pass through the outer and inner sets of holes 80 and 82 in all lug fittings 74.

Since the lock rings 92 and 94 pass through each lug fitting 74, there is provided between the side plates 78 of each fitting, an outer and inner pivot support. Every other lug fitting 74 pivotally supports an outer support arm 96 between its side plates 78 on lock ring 92, and every lug fitting 74 pivotally supports an inner support arm 98 between its side plates on lock ring 94. All lug fittings 74 and arms 96 and 98 are threaded on the split lock rings 92 and 94, prior to fastening the lug fittings to the coupling flanges 70, and cotter pins placed in holes provided in the ends of the locking rings 92 and 94 to fix the locking rings 92 and 94 relative to the lug fittings. All arms 96 and 98 are thus pivotally disposed to be movable toward and away from the axis of the reception coupling 62 with the desired operative limit position substantially as illustrated in FIGURE 1, and an inoperative folded position being with both inner and outer sets of arms substantially parallel to the coupling axis. All support arms are preferably made of material that is stiff and relatively rigid yet flexible having a streamline cross section faired into outer ends 102 and 104 of substantially rectangular cross section for added strength. The outer ends 102 and 104 are forked to provide respective slots 106 and 108, and a roller or cylindrical spacer 110 is retained in each of the slots by a removable pin to provide releasable attachment links for the loops of a parachute canopy to be fully described. The canopy 114 is indicated in phantom lines in FIGURE 1, canopy 114' illustrating how a larger area canopy can be used without changing the support arms when the operating airspeeds during which refueling takes place are going to be relatively low.

When the drogue is used on a reception coupling, as illustrated, the inner support arms 98 serve as a funnel-shaped guide fence to assure entrance of the probe into the opening 68 of the reception coupling. For this reason the inner arms 98 are spaced relatively close together so the entering end of the probe cannot pass or wedge between adjacent arms, but will be positively guided toward the coupling. To provide limited outward pivotal movement, provide support and assure equi-distant spacing between the divergent inner arms 98, the slots 108 in outer ends 104 are made of sufficient depth to receive a lashing 116, preferably flexible aircraft cable. Lashing cable 116 is formed in a continuous loop and has a plurality of flanged bushings 118, swaged, brazed or otherwise suitably fixed at spaced points around the cable loop. Each inner support arm 98 receives one of the flanged bushings 118 at the base of slot 108 below the canopy loop. The side flanges of bushing 118 are disposed on either side of the slot 108 in the ends of arm 98 to prevent lateral displacement of the bushing from its position in the slot and, when the drogue is in operation with the arms 98 divergent, will accurately maintain the proper distance between the outer ends 104 of adjacent inner arms 98. If desired a similar lashing may be used with the outer arms 96. However the divergent position of the outer arms will be controlled by the aerodynamic configuration of the canopy which, dependent upon the air speed relative to the drogue, assumes a different cross section configuration, therefore the pivotal movement of the outer arms is preferably unrestrained except for their positioning by coaction with the canopy.

*Canopy*

A rearwardly disposed ring type drag structure is essential on the drogue of this invention and a ring shaped collapsible canopy is preferred. To overcome the tendency to squid and partially or wholly collapse, present in previously known ring type parachutes, a new ring-foil-slot type canopy has been developed as one phase of this invention.

A section of a typical ring-foil-slot drogue canopy 114 is shown in FIGURE 2 and a diagrammatic sketch of the entire canopy is shown in FIGURE 6. The illustrated example of the canopy includes thirty-six single or eighteen double trapezoidal shaped sections 144 formed of three sub-panels, with a radial width of eleven inches, fabricated with two slots 146 and 148, and joined at their non-parallel edges to form a ring consisting of three concentric ring shaped panels 150, 152 and 154 separated by discontinuous slotted rings 146 and 148. These subpanels of sections 144, under dynamic air flow conditions, form pockets between the radial reinforcing strips 158 which are later described. The diameter of the exemplary drogue canopy is approximately 48 inches with total canopy area of 7.38 square feet. Tunnel tests on this canopy and reception coupling resulted in a total drag of 1388 lbs. at .47 Mach No. Using these values the $C_{D_0}$ is calculated as .588. Using the total effective or non-porous area of 4.64 square feet of the canopy results in a $C_{D_p}$ of 1.29. It is believed the actual $C_D$ of this canopy is probably closer to 1.29 because venturi action of the two slots 146 and 148 will contribute lift effects on the ring panels 150, 152 and 154 of the canopy. Furthermore the $C_D$ will vary with change in airspeed because of change in the angles of attack of the inner and outer ring panels when the center panel drag increases or decreases.

It is expected that reducing the effective canopy area to the order of 3.5 square feet will produce a total drag of coupling and canopy of approximately 1730 lbs. at .85 M. As it is difficult to establish the true projected drag area of the canopy the values are of necessity only approximate. The above load of 1730 lbs. is based on a conservative value of maximum projected diameter of 35 inches; however the possibility exists that a diameter of 32.5 might be closer to the true projected area, in which case maximum drag at .85 Mach would be slightly over 1100 lbs.

It has been previously stated that the canopy can be made of a number of materials which could be selected dependent upon conditions of use. Keeping in mind variable fabric characteristics it will be seen that canopy performance can be varied by changing fabric porosity, i.e., the foregoing exemplary canopy made out of material such as nylon fabric of high porosity, e.g., in the order of 150–200, can be used for high speed operation, and made out of nylon of low porosity, e.g., in the order of 50–90, can be used for low-speed operation.

In FIGURES 2 and 3 a typical fabrication pattern for a nylon canopy 114 is disclosed. The skirt hem 156 is relatively heavy nylon webbing fastened around the perimeter of the outer ring panel 150. Along the radial seam between each trapezoidal panel 144 is a double radial nylon webbing 158. If the trapezoidal panels 144 are of double construction, radial webs 158 are also stitched along the center of each panel. The vent opening, formed by the inner perimeter of inner ring panel 154, is reinforced by a nylon tape 160. All other bindings along the edges of the ring panels consist of Celanese or nylon tape 162. Riser arm retaining cords 164 and 166, made of braided, coreless nylon, are fastened on the lower side of the canopy along the skirt hem web 156 and along the vent reinforcement tape 160 with zigzag stitching 168. Stitching 168 is interrupted wherever the vent cord 166 passes across a radial web 158 and wherever the skirt hem cord 164 passes across every other radial web 158, to outer arm attachment loops 170 at every second radial web along the canopy skirt edge 156 and inner arm attachment loops 172 at every radial web along the vent edge 160. Additional radial reinforcing is provided between each outer loop 170 and its corresponding inner loop 172 by a length 174 of the braided, coreless nylon cord 174 having one of its ends passed into the braided loop 170, along its hollow center and out again as indicated at 176. The free end of the cord 174 is then inserted into its own body at 178 and passed in a short way to a position indicated at 179. The cord is then stitched to the radial web 158. The opposite end of cord 174 is woven through the inner loop 172, back into itself and stitched to the radial web 158 in the same manner. All seams are reinforced with zigzag stitches as illustrated. To make the canopy larger or smaller for the same drogue riser arm installation, the inner canopy diameter should be maintained constant and the area of fabric increased or decreased around the outer perimeter.

The center ring panel 152 in the disclosed canopy is a single panel but it is contemplated that larger canopies may incorporate two or more center ring panels with enlarged inner and outer ring panels. The design objective of this ring-foil-slot canopy is to achieve the major drag load with the central ring panel (or panels) disposed essentially normal to the free air stream. The outer and inner ring panels 150 and 154 respectively, are intended to perform the primary function of developing the outer and inner hoop tension in the drogue to an optimum magnitude for retaining the divergent expanded shape under load, without squidding or partially collapsing, through a wide speed range. The radial tension vectors developed by the air foil characteristics of the inner and outer ring panels must be of sufficient magnitude to exceed the normal drag force of substantially normally disposed central ring panels. Using a freely pivoted set of outer support arms 96 the active shape of the canopy section (FIGURE 4) can vary under loads imposed by varied air stream velocities until there exists a balancing of normal drag vectors and radial tension vectors to enable the canopy to retain a full non-collapsing configuration. Thus the critical velocity limits of the drogue extend over a relatively wide range.

Canopy 114 also serves secondary purposes in the refueling system. It can be treated with reflective material and easily illuminated at night by means of various lights to facilitate night refueling. It may also be treated with various luminscent or phosphorescent dyes for the same purpose and being ring shaped, is inherently an excellent target for the following aircraft.

Initial indications show that a drogue using the preferred ring-foil-slot canopy of this invention is stable at least up to speeds of 375 m.p.h. (maximum limit of wind tunnel), has good opening characteristics with about 20% increase of normal drag during opening shock, does not require a deployment bag for opening functions and has the advantage of a semi-rigid system over any other system.

Wind tunnel tests have been conducted on ring-foil-slot canopies of this invention. The canopy of this invention performed with excellent results. Stability was very good and the canopy opened under shock conditions of low speeds, occurring as the tunnel was started, up to 325 m.p.h. airspeeds. Shock openings above test speeds can be accomplished dependent upon strength of canopy fabric. Using a canopy with reinforcing as illustrated in FIGURE 2, drag runs were successfully made up to 376 m.p.h. without any damage or indication of squidding. Conclusions from the tests are that the drogue, including the new canopy, is obviously capable of performing at considerably higher speeds.

Flight test results available at this time indicate that excellent performance can be obtained in actual operational use with this invention. The drogue in flight, was highly stable and coupling attempt results were very successful. There was no apparent excitation of the drogue on approach—as usually happens with a solid type drogue. The buffeting, turbulent effect on the following aircraft, imposed by a solid drogue, appears to be entirely absent when using the drogue of this invention.

*Single arm collapsible drogue*

Illustrated in FIGURE 5, is a still further embodiment of a collapsible aerodynamic drag device 250 showing the use of one row of canopy support arms 252 as combined guiding and supporting arms for attachment to the outer perimeter 254 of a modified ring-foil canopy 256.

The canopy 256 may have solid panels, as illustrated in FIGURE 5, or it can be of the ring-foil-slot type previously described. The outer perimeter 254 of the canopy is to be constructed in a manner similar to that shown in FIGURE 2 with attachment loops 258 provided in alignment with the seams between panels for connection to the support arms 252 in a manner similar to that illustrated in FIGURE 1. A lashing 260 similar to the cable 116 in FIGURE 1, interconnects the ends of the pivoted arms, adjacent the canopy, and limits the conical divergence of arms 252. Sewn into the seam of the inner perimetral edge 262 of canopy 256 is a continuous loop flexible cable 264, of fixed circumference, which forms a circle when canopy 256 is deployed under an air load. When the canopy is in its circular dynamic shape, the inner perimetral cable 264 has smaller diameter than the canopy outer perimeter, as determined by the lashing cable 260, so the canopy material disposed between the two cables will constitute a ring shaped infinite air foil having a desired angle of attack relative to the free air stream.

At circumferential intervals on the inner side of the canopy 256, preferably between each canopy panel and in radial alignment with a support arm 252, substantially segmental shaped members 266, which can be made of the same material as the canopy, are sewn into the radial seam between adjacent panels to form a plurality of shaped pocket sections 268 around the ring canopy. The chord line 270 of each segmental member 266 limits the distance between the outer perimeter 254 of the canopy and the inner perimeter 262 to less than the width of canopy material thereby assuring a proper amount of canopy material to result in a cross-sectional longitudinal curvature to obtain the desired drag on the canopy. It is desirable to reinforce the chord line 270 of each arcuate member 266, for example, if nylon material is used for the arcuate members the chord line would be hemmed with a heavy nylon stretch resistant tape. By thus controlling the canopy cross section to provide a ring-foil canopy rather than a frusto-conical wind sock, at least a predetermined portion of the canopy area will be maintained substantially normal to the free air stream creating the required amount of high drag force and further enabling the radial tension vectors to develop the canopy and retain it in the required deployed shape.

The substantially segmental members 266 can be curved with true arcs or with any desired curvature compatible with proper air-foil profile. When a ring-foil-slot canopy, such as canopy 114 in FIGURES 2-4, is used as the canopy for the single arm drogue of FIGURE 5, the segmental members have a curvature to conform substantially with that illustrated in FIGURE 4 to properly deploy the inner and outer ring panels 154 and 150 for development of the opposing radial tension vectors which enable the canopy to maintain its shape under dynamic loads.

It will be appreciated that this invention comprises a basic concept for an aerodynamic drag device using a ring shaped rearwardly offset drag element fixed to a structure by flexible elongate support arms arranged to permit fluid stream flow through the inner periphery of the ring. The drag device is rendered highly flexible in adaptation to various uses by providing pivotal connections between one end of the support arms and the primary support structure and in using a collapsible ring shaped canopy releasably attached to the other ends of the pivotal arms. When used with the novel ring-foil-slot canopy the drogue operating characteristics are materially improved over characteristics when using other presently known types of parachutes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In a parachute canopy, inner and outer annular air foil panels having a ring shaped drag panel assembly between said inner and outer annular airfoil panels and spaced therefrom by narrow circumferential discontinuous slots, under dynamic conditions of airflow past the canopy the inner perimeter of the inner panel constituting its leading edge and the outer perimeter of the outer panel constituting its leading edge.

2. A parachute canopy as defined in claim 1 wherein a plurality of radially disposed members are circumferentially spaced around said canopy and are interconnected with the inner and outer panels and said drag panel assembly to thereby provide a plurality of circumferential pockets in said canopy.

3. A parachute canopy comprising at least three co-axial ring shaped panels disposed in concentric spaced relation with the area defined by the inner perimeter of the inner ring panel being equal to a substantial portion of total canopy area enabling a relatively unobstructed airflow path through said inner perimeter, a plurality of radial reinforcing members fixed to all panels and extending from the inner perimeter of the inner ring-shaped panel to the outer ring-shaped perimeter of the outer panel, annular tension resistant reinforcing means fixed to the inner ring-shaped perimeter of the inner panel and to the outer ring-shaped perimeter of the outer panel, and including circumferentially spaced means along each of said perimeters whereby said canopy may be attached to appropriate support structure.

4. A ring type parachute having a longitudinal axis to be disposed parallel with the airstream comprising: an inner airfoil of continuous span having its dynamic lifting force directed toward said axis, an outer airfoil of continuous span concentrically arranged relative to said inner airfoil and having its lifting force directed away from said axis, a drag ring of finite width concentrically disposed between said concentric airfoils and fixed at circumferential spaced positions to the trailing edges of said airfoils whereby the opposed lifting forces of said airfoils maintain said drag ring substantially transverse to the airstream and two annular groups of canopy support members fixed to the leading edges of said two airfoils, and adapted to be fixed to a support member.

5. A parachute canopy as defined in claim 1, including material on said canopy enabling said canopy to be rendered visible in the dark.

6. A parachute canopy as defined in claim 5, wherein said material is reflective.

7. A parachute canopy as defined in claim 5, wherein said material comprises luminescent dye.

References Cited in the file of this patent

UNITED STATES PATENTS

| | | |
|---|---|---|
| 1,319,553 | Ziegenfuss | Oct. 21, 1919 |
| 2,376,330 | Dircksen et al. | May 22, 1945 |
| 2,523,276 | Buhler | Sept. 26, 1950 |
| 2,651,481 | Steinthal | Sept. 8, 1953 |
| 2,692,103 | Cobham et al. | Oct. 19, 1954 |

FOREIGN PATENTS

| | | |
|---|---|---|
| 497,289 | Great Britain | Dec. 16, 1938 |
| 853,261 | France | Nov. 28, 1939 |

OTHER REFERENCES

Equipment Development Report No. 40, January 1956, pg. 4 only.

Flight Magazine, August 23, 1945, pp. 200-204.